(12) United States Patent
Armangau et al.

(10) Patent No.: US 11,663,336 B1
(45) Date of Patent: May 30, 2023

(54) BLOCK-BASED PROTECTION FROM RANSOMWARE

(71) Applicant: Dell Products L.P., Round Rock, TX (US)

(72) Inventors: Philippe Armangau, Acton, MA (US); Wai C. Yim, Merrimack, NH (US); Nagasimha Haravu, Apex, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/714,689

(22) Filed: Apr. 6, 2022

(51) Int. Cl.
- *G06F 21/56* (2013.01)
- *G06F 21/60* (2013.01)
- *G06F 21/57* (2013.01)
- *G06F 21/00* (2013.01)

(52) U.S. Cl.
CPC .......... *G06F 21/568* (2013.01); *G06F 21/561* (2013.01); *G06F 21/577* (2013.01); *G06F 21/60* (2013.01); *G06F 2221/034* (2013.01)

(58) Field of Classification Search
CPC .... G06F 21/577; G06F 21/568; G06F 21/561; G06F 21/56; G06F 21/566; G06F 21/50; G06F 21/55; G06F 21/552; G06F 21/554
See application file for complete search history.

(56) References Cited

U.S. PATENT DOCUMENTS

| | | | |
|---|---|---|---|
| 9,940,460 B1 | 4/2018 | Derbeko et al. | |
| 10,078,459 B1 * | 9/2018 | Natanzon | G06F 3/067 |
| 10,409,986 B1 | 9/2019 | Natanzon et al. | |
| 10,650,146 B1 * | 5/2020 | Gaurav | G06F 21/565 |
| 10,742,665 B2 | 8/2020 | Gu et al. | |
| 10,795,994 B2 | 10/2020 | Mehta et al. | |
| 11,170,104 B1 * | 11/2021 | Stickle | G06N 20/00 |
| 2020/0226256 A1 | 7/2020 | Gaurav et al. | |
| 2021/0042411 A1 * | 2/2021 | Annen | G06F 21/566 |
| 2022/0027472 A1 | 1/2022 | Golden et al. | |

OTHER PUBLICATIONS

Extended European Search Report for application No. 22175875.8, dated Nov. 11, 2022, 9 pages.

* cited by examiner

*Primary Examiner* — Edward Zee
(74) *Attorney, Agent, or Firm* — BainwoodHuang

(57) ABSTRACT

A technique of protecting data from ransomware attacks identifies a set of blocks written to a data object between first and second points in time, determines a set of attributes of the set of blocks, and, in response to the set of attributes indicating a likelihood of a ransomware attack, secures a state of the data object as of the first point in time.

20 Claims, 7 Drawing Sheets

BLOCK-BASED PROTECTION FROM RANSOMWARE

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

A regrettable reality of modern technology is that computers can become the targets of ransomware attacks. For example, a ransomware script may infiltrate a host machine and attempt to encrypt files or portions of files backed by a data storage system. The resulting encryption renders the files unreadable. A ransom note may be left on an affected host, and substantial sums of money may be paid to receive a key that can decrypt the data. As ransomware software can contain errors, even paying for the key provides no guarantee that the data can be fully recovered.

Various solutions have been proposed for responding to ransomware attacks. Some solutions perform detailed analyses of backups in an attempt to get behind an attack. Assuming a clean backup prior to the attack can be identified, the backup can be restored on the host system and the host system can proceed with its normal operations.

SUMMARY

Unfortunately, the above-described approaches to managing ransomware attacks can be reactive and slow. A host machine can be offline for an extended period of time until a clean backup can be found and restored, and substantial data loss may occur. What is needed is a more proactive approach that reduces data unavailability and/or data loss.

The above need is addressed at least in part by an improved technique that identifies a set of blocks written to a data object between first and second points in time, determines a set of attributes of the set of blocks, and, in response to the set of attributes indicating a likelihood of a ransomware attack, secures a state of the data object as of the first point in time.

Advantageously, the improved technique can detect a ransomware attack that occurs between the first and second points in time based on the attributes of the blocks that have been written during that interval of time. The second point in time may approximately be the present, and the first point in time may be a recent time in the past, thus enabling a prompt detection and response, in many cases prior to any user even detecting that the ransomware attack has occurred. If the attack is confirmed, the data object may be restored to its state as of the first point in time. Restoration can thus be performed quickly, with minimal data unavailability and minimal data loss.

Certain embodiments are directed to a method of protecting data from ransomware attacks. The method includes identifying a set of blocks written to a data object between a first point in time and a second point in time later than the first point in time, determining a set of attributes of the identified set of blocks, and, in response to the set of attributes indicating a likelihood of a ransomware attack, securing a state of the data object as of the first point in time.

Other embodiments are directed to a system that includes a first data storage system and a second data storage system. The first and second data storage systems are configured to perform replication of a data object hosted by the first data storage system. The first data storage system is constructed and arranged to identify a set of blocks written to the data object between a first point in time and a second point in time later than the first point in time, and to send the identified set of blocks to the second data storage system. The second data storage system is constructed and arranged to receive the identified set of blocks and, in response to a set of attributes of the identified set of blocks indicating a likelihood of a ransomware attack, secure a state of the data object as of the first point in time.

Still other embodiments are directed to a computer program product. The computer program product stores instructions which, when executed on control circuitry of a computerized apparatus, cause the computerized apparatus to perform a method of protecting data from ransomware attacks, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Figure 1:
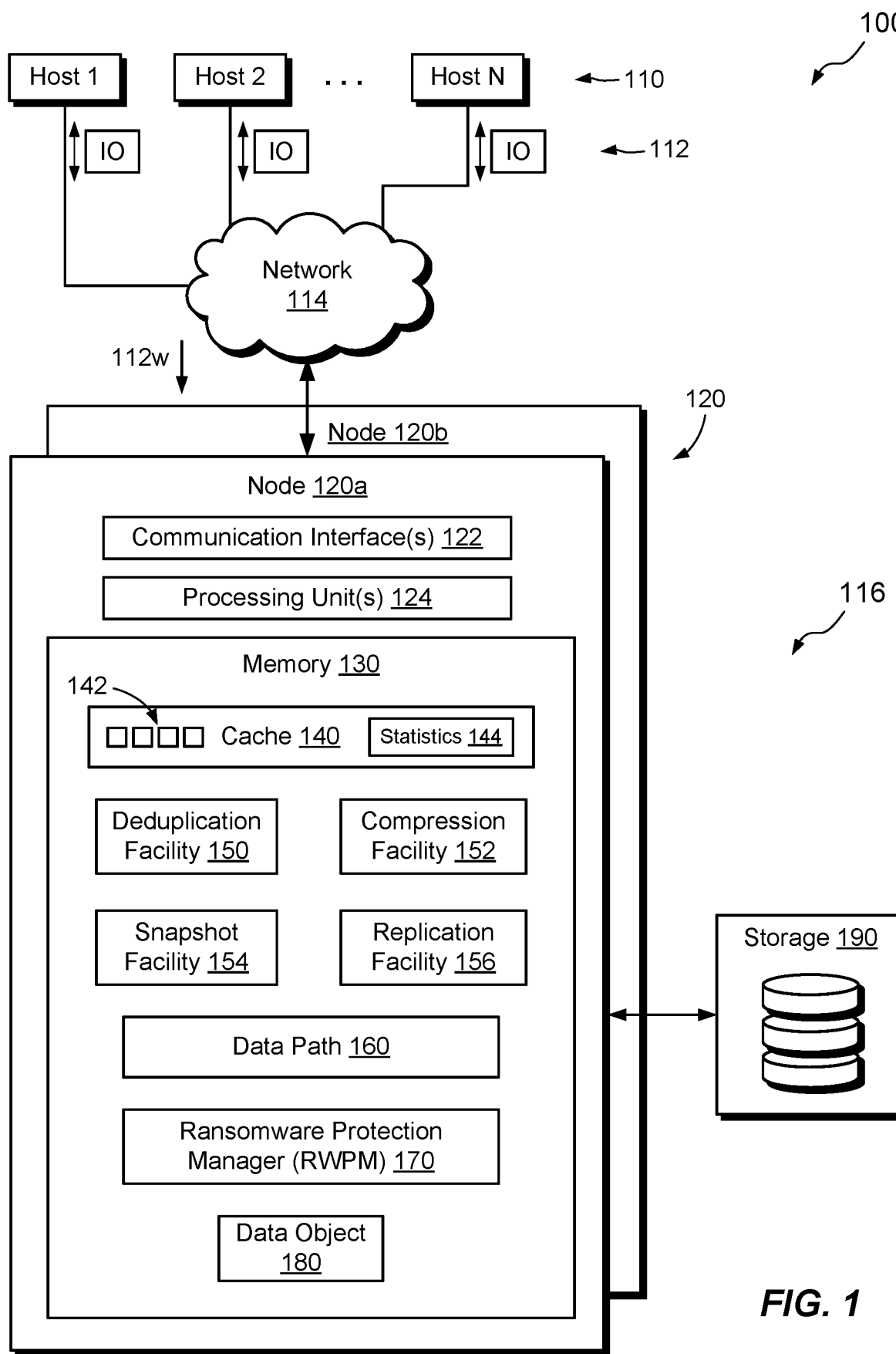
FIG. 1 is a block diagram of an example environment in which certain embodiments of the improved technique can be practiced.

Embodiments of the improved technique will now be described. One should appreciate that such embodiments are provided by way of example to illustrate certain features and principles of the disclosure but are not intended to be limiting.

An improved technique of protecting data from ransomware attacks identifies a set of blocks written to a data object between first and second points in time, determines a set of attributes of the set of blocks, and, in response to the set of attributes indicating a likelihood of a ransomware attack, secures a state of the data object as of the first point in time.

The improved technique is amenable to a variety of implementations. In some arrangements, the technique is carried out by a single data storage system configured to take regular snapshots (point-in-time versions) of a data object. The data storage system may identify blocks written to the data object between each successive pair of snapshots, determine attributes of those blocks, and secure an earlier snapshot of a current pair of snapshots in response to the attributes indicating a likelihood of a ransomware attack. This "standalone" implementation leverages snapshot technology, which is a common feature found in data storage systems that support block-based storage.

In other arrangements, the technique is carried out by a first data storage system and a second data storage system, which are configured to perform asynchronous replication of a data object hosted by the first data storage system. The asynchronous replication is arranged to take regular snapshots of the data object in the first data storage system, to compute differences between a current snapshot and an immediately previous snapshot, and to ship the differences to the second data storage system, where the computed differences are applied to a replica of the data object. The differences, also referred to herein as a "deltaset," indicate blocks written to the data object between successive snapshots. When the second data storage system receives a deltaset from the first data storage system, the second data storage system determines attributes of the blocks specified by the deltaset, and secures an earlier snapshot of a current pair of snapshots in response to the attributes indicating a likelihood of a ransomware attack. This implementation thus leverages the features of asynchronous replication technology, which is also commonly found in data storage systems that support block-based storage.

Both the standalone and replication-based solutions may be implemented in a lightweight manner. Snapshots, whether managed directly or as part of asynchronous replication, may be provided in a form that consumes little storage space, e.g., compared to backups. Thus, creating and securing snapshots to protect against ransomware attacks has little impact on the storage resources of a data storage system. The low impact of snapshots also helps to ensure that false detections of ransomware attacks can be easily tolerated.

FIG. 1 shows an example environment 100 in which embodiments of the improved technique can be practiced. Here, multiple hosts 110 are configured to access a data storage system 116 over a network 114. The data storage system 116 includes one or more storage processors 120, referred to herein as "nodes" (e.g., nodes 120a and 120b), and storage 190, such as magnetic disk drives, electronic flash drives, and/or the like. Nodes 120 may be provided as circuit board assemblies or blades, which plug into a chassis (not shown) that encloses and cools the nodes. The chassis has a backplane or midplane for interconnecting the nodes 120, and additional connections may be made among nodes 120 using cables. In some examples, the nodes 120 are part of a storage cluster, such as one which contains any number of storage appliances, where each appliance includes a pair of nodes 120 connected to shared storage. In some arrangements, a host application runs directly on the nodes 120, such that separate host machines 110 need not be present. No particular hardware configuration is required, however, as any number of nodes 120 may be provided, including a single node, in any arrangement, and the node or nodes 120 can be any type or types of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where hosts 110 are provided, such hosts 110 may connect to the nodes 120 using various technologies, such as Fibre Channel, iSCSI (Internet small computer system interface), NVMeOF (Non-volatile Memory Express (NVMe) over Fabrics), NFS (network file system), and CIFS (common Internet file system), for example. As is known, Fibre Channel, iSCSI, and NVMeOF are block-based protocols, whereas NFS and CIFS are file-based protocols. The nodes 120 may each be configured to receive I/O requests 112 according to block-based and/or file-based protocols and to respond to such I/O requests 112 by reading or writing the storage 190.

The depiction of node 120a is intended to be representative of all nodes 120. As shown, node 120a includes one or more communication interfaces 122, a set of processing units 124, and memory 130. The communication interfaces 122 include, for example, SCSI target adapters and/or network interface adapters for converting electronic and/or optical signals received over the network 114 to electronic form for use by the node 120a. The set of processing units 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a cache 140 and numerous facilities, such as a deduplication facility 150, a compression facility 152, a snapshot facility 154, and a replication facility 156. These facilities may be useful in various embodiments but should not be regarded as required. The memory 130 may further realize a data path 160, a ransomware protection manager (RWPM) 170, and any number of data objects, such as data object 180. The data object 180 may be any type of object, such as a LUN (Logical UNit), a file system, a virtual machine disk, or the like. In some examples, the nodes 120 are agnostic to the contents of the data object 180 and treat the data object 180 simply as a block-based volume.

The data object 180 is composed of blocks, where a "block" is a unit of allocatable storage space. Blocks are typically uniform in size, with typical block sizes being 4 kB (kilo-Bytes), 8 kB, or 16 kB, for example. No particular block size is required, however, and embodiments may support non-uniform block sizes. The data storage system 116 is configured to access the data object 180 using block-based protocols, for example, by specifying blocks of the data object 180 to be created, read, updated, or deleted.

Cache 140 is configured to receive data of incoming writes 112w from hosts 110 and to arrange the data into pages 142, which may be block-size, for example. The cache 140 is configured to hold the incoming data temporarily until the node 120a can process the data for incorporation into data objects, such as data object 180. The cache 140 may also store recently-read data of the data objects and may track statistics 144 related to cache performance. For example, the statistics 114 may include a cache hit rate for writes, which may be tracked on a per-data-object (per volume) basis. The cache "hit rate" for writes refers to the proportion of writes for which the block to be written can already be found in cache 140.

Deduplication facility 150 is configured to perform deduplication, a process whereby redundant blocks are replaced with pointers to a fewer number of retained copies of those blocks. Deduplication may be performed in an inline or near-inline manner, where pages 142 in the cache 140 are compared with a set of existing blocks in the data storage system 116 (e.g., using hash-based matching), and duplicate copies are avoided prior to being written to persistent data-object structures. In some examples, deduplication may also be performed in the background, i.e., out of band with the initial processing of incoming writes. Deduplication is sometimes abbreviated as "dedupe," and the ability to perform deduplication on data of a data object may be described as that data object's "dedupability." In an example, metadata of data objects track whether particular blocks are duplicates or originals, e.g., via a deduplication flag.

Compression facility 152 is configured to perform data compression. As with deduplication, compression may be performed inline or near-inline, with pages 142 in cache 140 compressed prior to being written to persistent data-object structures. In an example, metadata of data objects track the compressed sizes of blocks. Some blocks are more compressible than others. Typically, compression is performed on a per-block basis after deduplication is attempted.

Snapshot facility 154 is configured to generate and manage snapshots. A snapshot (or "snap") is a point-in-time version of a data object, i.e., a version that preserves the state of a data object as of the time it is taken, even as the data object continues to evolve in response to changes. In an example, a snapshot is initially created as a new data object having its own identity and metadata, but the metadata of the snapshot points to the data of the data object from which the snapshot is taken. Thus, there is no need to copy any data and the snapshot is initially a small, lightweight structure. Over time, as the data object changes, new blocks are allocated to accommodate new writes and pointers of the data object are adjusted to point to the new blocks. But the data of the snapshot remains intact. Thus, changes in a data object after a snapshot has been taken have no effect on the snapshot itself. One should appreciate that lightweight snapshots may be realized in a variety of ways, and that the description above is intended to be illustrative rather than limiting.

Replication facility 156 is configured to perform replication on data objects, i.e., by maintaining one or more copies of a data object. Typically, replication is performed between two data storage systems, with one designated as a "source" and the other designated as a "destination." The source is the data storage system that "hosts" a data object, i.e., makes the data object available to hosts 110 for reading and/or writing, whereas the destination is the data storage system that maintains a "replica" of the data object, i.e., a copy of the data object that is current or nearly current. In an example, replication facility 156 is configured to perform asynchronous replication, also known as "snapshot shipping." Asynchronous replication works by taking regular snapshots of a data object on a specified schedule, such as once every five minutes, once every hour, or at some other rate, which is typically defined by an administrator. Each time a new snapshot of the data object is taken, the replication facility 156 computes a deltaset, i.e., a set of changes or differences between blocks of the new snapshot and blocks of the immediately previous snapshot. The replication facility 156 then transmits (or "ships") the deltaset to the destination, which applies the deltaset in updating the replica. Once the update is complete, the contents of the replica are identical to those of the data object as of the most recent snapshot taken at the source.

Data path 160 is configured to provide metadata for accessing data of data objects, such as data object 180. As described in more detail below, data path 160 may include various logical blocks, mapping pointers, and block virtualization structures, for example, and may track various attributes of blocks.

Ransomware protection manager (RWPM) 170 is configured to detect ransomware attacks and to secure the states of data objects just prior to the ransomware attacks. For example, the RWPM 170 is configured to identify blocks written to data object 180 between a first point in time and a second point in time, to determine attributes of the newly written blocks, and to analyze the attributes for signs of a ransomware attack. If a ransomware attack is suspected, the RWPM 170 is configured to secure the state of the data object 180 as of the first point in time, which is prior to the suspected attack, and to generate an alert that a ransomware attack may be in progress. The alert may take a variety of forms, such as an email message or other communication to an administrator and/or any number of users.

In example operation, hosts 110 issue I/O requests 112 to the data storage system 116. Node 120a receives the I/O requests 112 at the communication interfaces 122 and initiates further processing. Such processing may involve reading and/or writing the data object 180. New writes may be subject to deduplication or, if no deduplication can be achieved, compression. In some examples, snapshots of data object 180 may be taken and replication of data object 180 may be performed. If a host 110 is infected with ransomware, then I/O requests 112 may include reads of blocks of the data object 180 followed by writes of encrypted versions of those blocks back to the data object 180.

Figure 2:
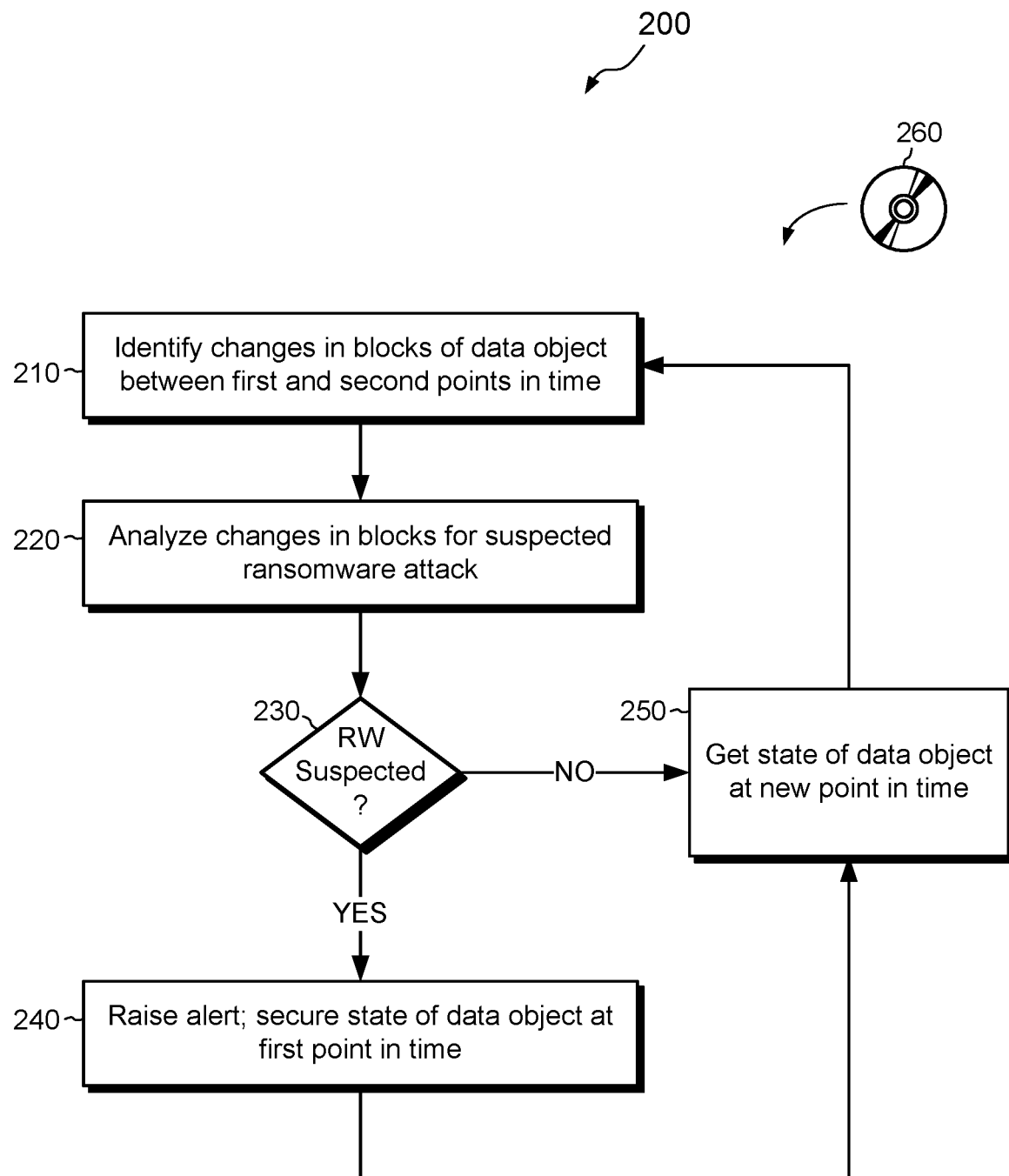
FIG. 2 is a flowchart showing example activities that may be performed in the environment of FIG. 1.

FIG. 2 shows an example method 200 that may be performed and/or directed by the RWPM 170. Method 200 provides a high-level summary of various embodiments, including embodiments performed by a single data storage system (standalone) and embodiments that involve two data storage systems engaged in asynchronous replication.

At 210, changes in blocks of a data object 180 are identified between first and second points in time. In an example, this act involves identifying new blocks that have been written during the period between first and second snapshots of the data object 180.

At 220, the changes are analyzed for a suspected ransomware attack. For example, the RWPM 170 gathers and/or generates attributes of the new blocks. The RWPM 170 then determines, based on the attributes, whether a ransomware attack is likely. The determination may take various forms. In some examples, a ransomware score is generated, where a higher score corresponds to a greater likelihood of a ransomware attack and a lower score corresponds to a lower likelihood. The ransomware score may be based on a combination of the attributes, such as an algebraic combination (e.g., weighted sum) or one that uses machine learning, such as a neural net, e.g., one with attributes provided as inputs and weights used to balance the contributions of the attributes.

At 230, the RWPM 170 determines whether a ransomware attack is suspected. For example, the above-mentioned ransomware score may be compared to a threshold, with scores that exceed the threshold deemed to indicate suspected attacks and scores that fall below the threshold deemed not to do so. In some examples, the determination of a ransomware attack is based on anomaly detection rather than on absolute score. Using anomaly detection can help to accommodate differences in data or data access patterns of different users. For example, a baseline score may be determined based on multiple operations of the RWPM 170, and the determination at 230 may respond to a current set of attributes producing a score that exceeds the baseline score by some specified amount. That specified amount may be user-adjustable, such that users may tune the sensitivity of the RWPM 170 based on their preferences.

If act 230 determines that a ransomware attack is suspected, operation proceeds to 240, whereupon the RWPM 170 raises an alert (e.g., sends an email to users) and secures the state of the data object as of the first point in time. Securing the state of the data object may include preserving the first snapshot, which served as the reference for determining the new writes. Preserving the first snapshot may involve securing it against edits or deletion, even by administrators. In some examples, preserving the snapshot involves generating a new snapshot of the first snapshot. The new snapshot is referred to herein as a "pre-attack snapshot." The pre-attack snapshot is then protected against edits or deletion. If the ransomware attack is confirmed, e.g., based on user analysis of the second snapshot, the pre-attack snapshot may be used as a basis for restoring the data object 180 to its state prior to the ransomware attack.

Optionally, the method 200 may continue even after a ransomware attack is suspected. For example, operation may proceed to 250, whereupon the state of the data object 180 is obtained at a new point in time. For example, a third snapshot is taken of the data object 180 and the method 200 is repeated. Upon repeating, the above-described first snapshot may be deleted. The above-described second snapshot may then become the new "first snapshot," and the third snapshot may become the new "second snapshot."

If act 230 determines that a ransomware attack is not suspected, then operation proceeds to 250, and the method 200 is repeated as described above. The method 200 may repeat in this manner indefinitely.

Figure 3:
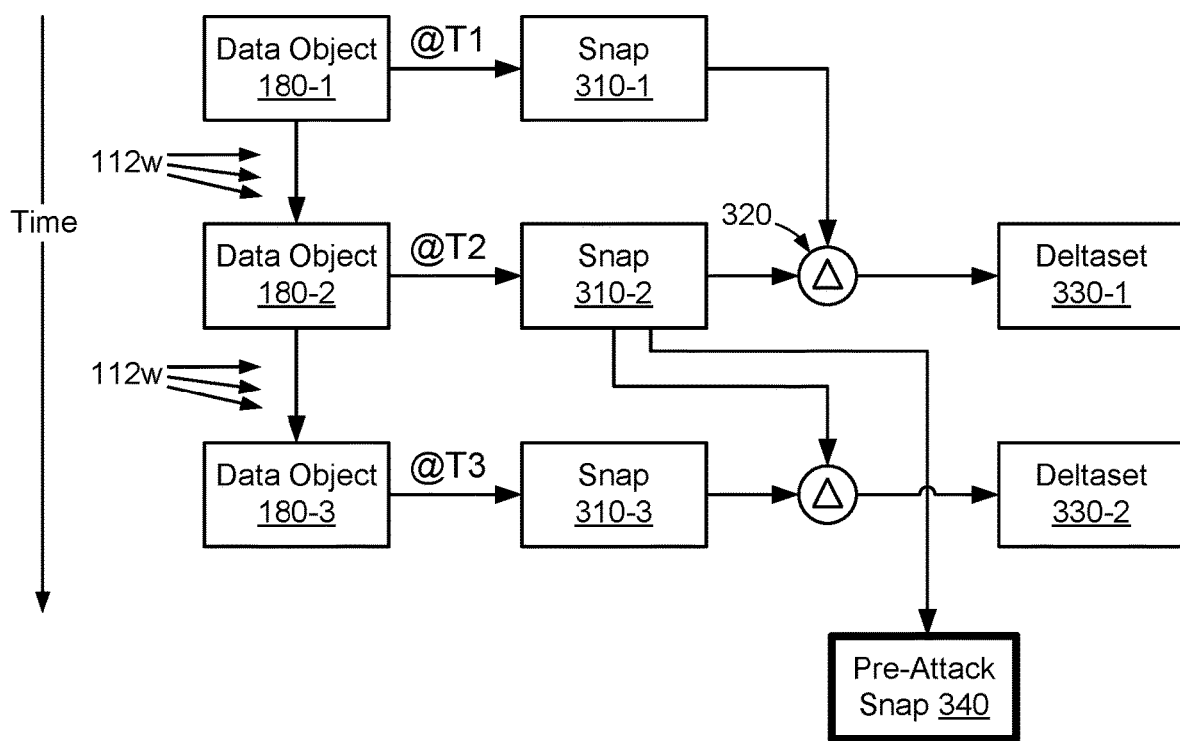
FIG. 3 is a block diagram showing an example arrangement for detecting and responding to ransomware.

FIG. 3 shows an example arrangement for using snapshots to detect a ransomware attack. The depicted arrangement applies both to embodiments performed by a single data storage system and to embodiments that involve two data storage systems engaged in asynchronous replication.

As shown, data object 180 evolves over time, e.g., in response to new writes 112w. At time T1, a snapshot 310-1 is taken of data object 180, designated here as object 180-1. The snapshot 310-1 thus provides a point-in-time version of data object 180 as of time T1.

At time T2, a snapshot 310-2 is taken of data object 180, designated here as object 180-2. The snapshot 310-2 thus provides a point-in-time version of data object 180 as of time T2. Here, snapshot 310-1 may be regarded as a "first" snapshot and snapshot 310-2 may be regarded as a "second" snapshot. As indicated by arrow 320, a difference, shown as deltaset 310-1, is generated between the first snapshot 310-1 and the second snapshot 310-2. Deltaset 330-1 thus identifies blocks of the data object 180 that were written after the first snapshot 310-1 was taken but before the second snapshot 310-2 was taken.

With the deltaset 330-1 identified, the RWPM 170 obtains, generates, or otherwise determines a set of attributes of the newly-written blocks specified by the deltaset 330-1. The RWPM 170 then computes a determination, based on the set of attributes, of whether a ransomware attack is suspected. In this case, it is assumed that no ransomware attack is suspected.

At time T3, a snapshot 310-3 is taken of data object 180, designated here as object 180-3. Here, snapshot 310-2 may be regarded as the "first" snapshot and snapshot 310-3 may be regarded as the "second" snapshot (snapshot 310-1 may be disregarded or deleted). As indicated, a deltaset 330-2 is generated between the snapshot 310-2 and the snapshot 310-3. The RWPM 170 then determines a set of attributes of the newly-written blocks, this time the blocks identified in deltaset 330-2, and the RWPM 170 computes a determination of whether a ransomware attack is suspected. In this case, it is assumed that a ransomware attack is suspected. As a result, a pre-attack snapshot 340 is taken of the "first" snapshot 310-2. The pre-attack snapshot 340 is secured so that it remains available for restoring the data object 180 if a ransomware attack is confirmed. An alert may also be sent at this time.

Figure 4:
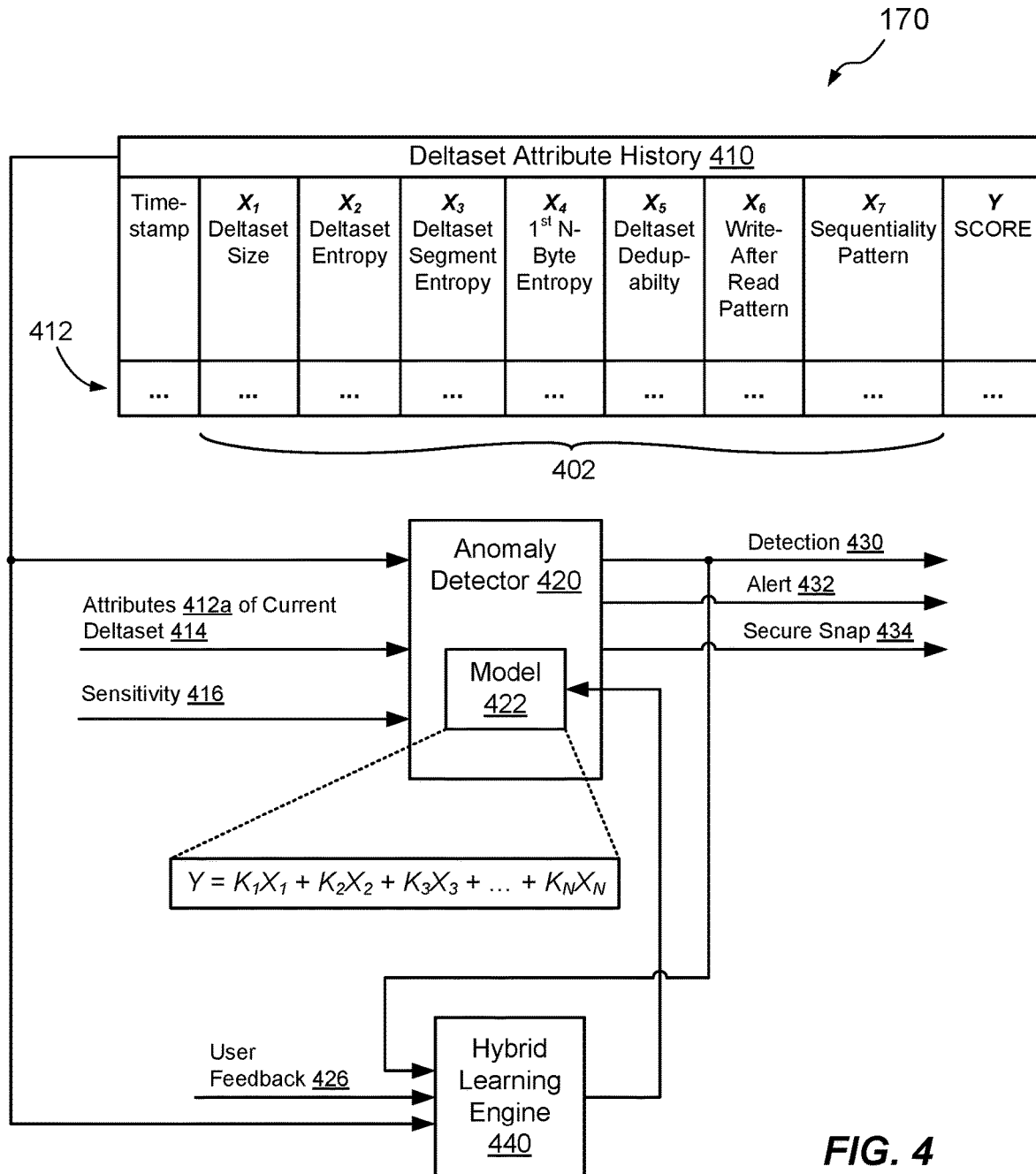
FIG. 4 is a block diagram of a ransomware protection manager of FIG. 1 in greater detail.

FIG. 4 shows an example of the RWPM 170 in greater detail. The RWPM 170 is seen to include a deltaset attribute history 410, an anomaly detector 420, and a hybrid learning engine 440. One should appreciate that the depicted constituents of the RWPM 170 are presented as examples and should not be construed as required or limiting.

The deltaset history 410 records a history of attributes 402 determined for respective deltasets. In an example, the deltaset attribute history 410 includes multiple rows 412, where each row 412 provides a respective set of attributes 402 determined for a respective deltaset. Columns may be provided for different attributes, identified as $X_1$ through $X_N$, where N=7 in the example shown (greater or lesser numbers of attributes may be used). Additional columns may be provided for recording a timestamp, e.g., a time when each deltaset was created, and for recording a score, Y, which is computed based on the respective attributes 402 of respective deltasets.

For processing a current deltaset 414, anomaly detector 420 may receive as inputs the attributes 412a of the current deltaset 414 as well as the deltaset attribute history 410. The anomaly detector 420 may further receive a sensitivity input 416, such as a user-adjustable setting that specifies a level of sensitivity that the anomaly detector 420 applies in generating detections 430 of suspected ransomware attacks. Outputs of the anomaly detector include a detection 430 of a suspected ransomware attack, as well as an alert 432 that a suspected attack has been detected and a directive 434 to secure the first snapshot used in determining the current deltaset 414, e.g., by creating and preserving a pre-attack snapshot 340 as described in connection with FIG. 3.

In an example, the anomaly detector 420 operates a model 422 for detecting suspected ransomware attacks. As shown, the model 422 may be provided as an equation that generates a score Y as a weighted sum of attributes $X_1$ through $X_N$, which are weighted by respective coefficients $K_1$ through $K_N$. For example, $$Y = \sum_{i=1}^{N} K_i X_i.$$

Preferably, anomaly detector 420 triggers detection of suspected ransomware attacks based on anomalous increases in the score Y above a baseline score, which may be established, for example, as a moving average of scores computed from previous deltasets. Alternatives to weighted sums may include neural networks, for example.

The coefficients $K_1$ through $K_N$ may be adjusted over time to optimize their values for particular users and to improve the accuracy of the model 422. In some examples, coefficients $K_1$ through $K_N$ are adjusted based on user feedback 426. For example, hybrid learning engine 440 may associate detections 430 of suspected ransomware attacks with deltasets that resulted in those detections and with user feedback 426 that indicates whether the suspected attacks are true attacks or false positives, i.e., anomalous behavior not associated with ransomware attacks. Using the deltaset attribute history 410 for back-testing and optimization, the hybrid learning engine 440 can zero-in on values of coefficients that result in improved detections.

In some examples, the hybrid learning engine 440 is implemented at least in part using a data analytics platform, which may be implemented locally to a data storage system, on a separate computer, or elsewhere, such as in the cloud. In some examples, the hybrid learning engine 440 applies a batch-learning approach, where data about deltaset attributes, detections, and user feedback are stored locally and periodically transferred to the data analytics platform, which then operates based on accumulated batches of information.

Examples of attributes 402 for supporting block-based detection of ransomware attacks will now be described with continued reference to FIG. 4. Such examples may include the following:

Deltaset size. The size of a deltaset, i.e., the number of blocks identified as written in the deltaset, may be a strong indicator of a ransomware attack. Attack scripts tend to generate a large number of writes of encrypted data to a data object in a short period of time. Thus, a sudden increase in deltaset size can be highly suggestive of a ransomware attack.

Deltaset entropy. Encrypted blocks written during ransomware attacks tend to have high entropy. Entropy values of blocks may be calculated directly, e.g., using well-known software functions. We have recognized, however, that compressibility of blocks negatively correlates strongly with entropy, such that the more compressible a block is, the lower its entropy. Likewise, the less compressible a block is, the higher its entropy. As described more fully below, compressed sizes of blocks may be readily available in system metadata. Thus, the entropy of blocks in the deltaset can be estimated easily based on the compressed sizes of those blocks. For example, if a 4-kB block compresses down to 1 kB, the entropy of that block is taken to be low. Contrarily, if a 4-kB block compresses to only 3.99 kB, the entropy of that block is taken to be high. A marked increase in the compressed sizes of blocks in a deltaset can thus indicate a ransomware attack.

Deltaset segment entropy. The number of blocks (or extents) in a deltaset that have high entropy. Ransomware attacks often encrypt only portions of data objects, e.g., just enough data to render the data objects unusable. Thus, an increase in the number of blocks or other extents in a deltaset that have high entropy can indicate a ransomware attack, even when the entropy of the deltaset as a whole remains stable.

First N-byte entropy. Some ransomware attacks encrypt files that are smaller than a block in size (e.g., smaller than 4 kB), where each file may be stored in its own respective block. In such cases, only the first N bytes of a block may be encrypted. Such encryption may be detected by examining the entropy of initial N-byte regions of the blocks in a deltaset. The value of N may be user-selectable, with typical values of N ranging between 32 bytes and 256 bytes, for example. Entropy of small regions of blocks may be computed efficiently and directly, e.g., using known entropy functions. An increase in first N-byte entropy can thus provide an additional sign of a ransomware attack.

Deltaset dedupability. Blocks encrypted by ransomware attacks tend to be poorly dedupable, i.e., unlikely to match with blocks that are already stored in a data storage system. As described below, system metadata stores information that indicates whether a block is deduplicated. A dedupability score may be computed as a percentage of blocks in a deltaset that are deduplicated. A decrease in dedupability of blocks in a deltaset can be a strong sign of a ransomware attack.

Write-after-read pattern (WaRP). Ransomware attacks tend to proceed by reading data of a data object, encrypting that data, and then writing the encrypted data back to the data object. As node 120a (FIG. 1) may be configured to store recently-read blocks temporarily in cache 140, it can be expected that a ransomware attack that performs many read-modify-writes may result in an increase in cache hits for blocks of the data object. Thus, an increase in the hit rate of the cache 140 in response to host writes to the data object may be a strong indicator of a ransomware attack.

Sequentiality pattern. Ransomware attacks tend to write encrypted data in long sequential patterns. The blocks of a deltaset may be analyzed for sequential patterns, e.g., based on the blocks being written to sequential LBAs (logical block addresses) of a data object. An increase in sequential writes may thus be another strong indicator of a ransomware attack.

It should be emphasized that the above-identified attributes 402 are merely examples of attributes that are suitable for block-based detection of ransomware attacks. A greater or fewer number of attributes may be used, and attributes besides those mentioned may be used. Further, one should appreciate that attributes 402 may be obtained easily from system metadata and/or statistics, or computed based on analysis of blocks identified in a deltaset. Some amount of pre-processing may be performed on the attributes 402 to express them in common terms, so that the attributes 402 may be readily combined by the model 422. For example, attributes 402 may be scored individually on a scale of 1 to 10, with "1" indicating a lowest risk of ransomware attack and "10" indicating a highest risk. For example, a very large value of deltaset entropy may correspond to a "10." Likewise, a very high value of deltaset dedupability may correspond to a "1." This is merely an example.

Figure 5:
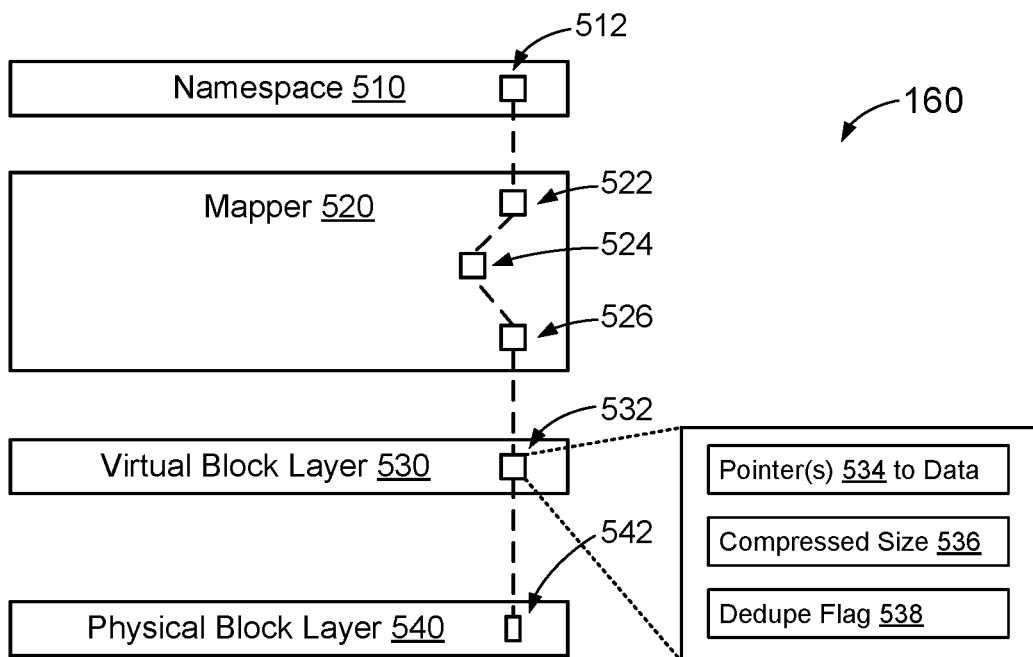
FIG. 5 is a block diagram of an example data path from which information may be obtained for determining one or more attributes of blocks.

FIG. 5 shows an example data path 160 of FIG. 1 in greater detail. The data path 160 provides an arrangement of metadata used for accessing data in the data storage system 116, such as data blocks of data object 180. In some examples, the metadata may be used to provide certain attributes 402 used by the RWPM 170.

As shown, the data path 160 includes a namespace 510, a mapping structure 520 ("mapper"), a virtual block layer 530, and a physical block layer 540. The namespace 510 is configured to organize logical data, such as that of LUNs, file systems, virtual machine disks, snapshots, clones, and the like, which may include data object 180 and its snapshots. In an example, the namespace 510 provides a large logical address space and is denominated in blocks 512 (one block shown). The mapper 520 is configured to point logical blocks 512 in the namespace 510 to respective descriptors 532 of virtual blocks in the virtual block layer 530. The mapper 520 may include multiple levels of pointers, such as tops 522, mids 524, and leaves 526, which together are capable of mapping large amounts of data. The virtual block layer 530 provides a level of indirection between the mapper 520 and the physical block layer 540, allowing physical blocks to be moved without disturbing pointers in the mapper 520. Physical blocks 542 (one shown) in the physical block layer 540 are typically compressed.

In an example, the descriptors 532 in the virtual block layer store metadata about the blocks that they represent. The metadata of a descriptor 532 includes a pointer 534 to the physical block 542 that stores the compressed block. It also includes a compressed size 536 of the compressed block 542 and a dedupe flag 538. The dedupe flag 538 indicates whether the block has been deduplicated.

In an example, processing a deltaset may involve reading metadata from descriptors 532, such as compressed size 536 and/or dedupe flag 538. In the standalone case, in which only a single data storage system is used, the storage system may perform a modified read operation that obtains the metadata 536 and/or 538 from the associated descriptors 532.

In cases involving asynchronous replication, the replication facility 156 (FIG. 1) may read blocks identified by a deltaset as part of its normal operation, so that it may obtain the identified blocks and send them to the destination. Such a "read for replication" normally reads the descriptors 532 of associated virtual blocks in order to access the physical data. In an example, this replication function is adapted to obtain the compressed size 536 and/or the dedupe flag 538 in addition to the data, such that the metadata 536 and/or 538 may be propagated to the destination along with the deltaset and associated blocks. The metadata 536 and/or 538 is thus made available to the destination as attributes 402 of the deltaset, which may be used by a RWPM 170 at the destination for detecting suspected ransomware attacks.

Figure 6:
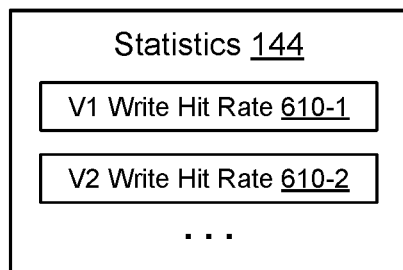
FIG. 6 is a block diagram of example cache statistics from which information may be obtained for determining one or more attributes of blocks.

FIG. 6 shows an example of cache statistics 144 in greater detail. Here, statistics for write hit rate are maintained on a per-volume basis. For example, hit rates 610-1 and 610-2 are maintained for respective volumes V1 and V2, where one of the volumes V1 or V2 may correspond to data object 180. In an example, write hit rate of the volume for data object 180 is provided to the RWPM 170 as an indicator of a write-after-read pattern (WaRP), which may be used in detecting suspected ransomware attacks.

Figure 7:
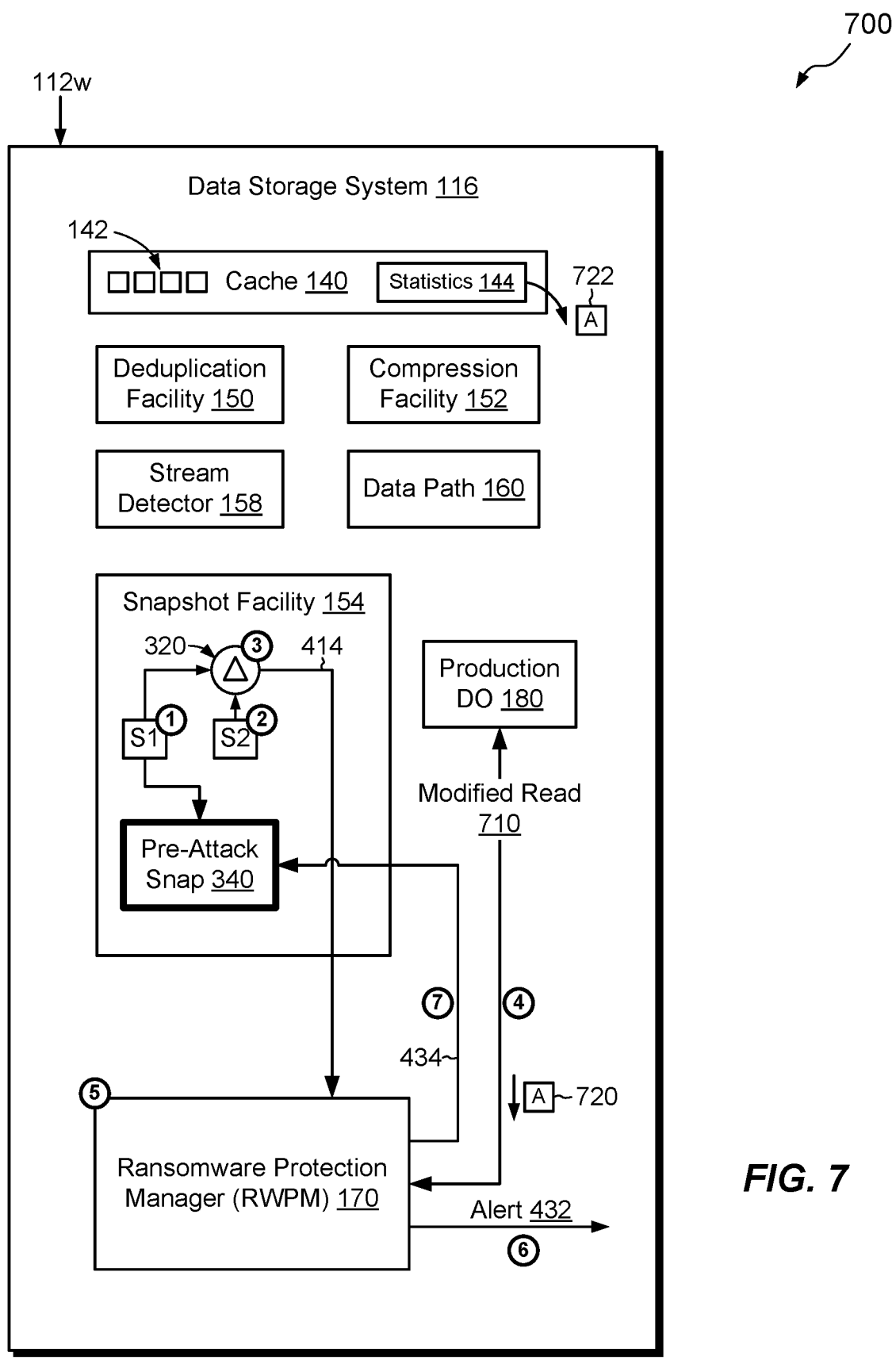
FIG. 7 is a block diagram of an example arrangement in which a single data storage system is used for protecting data from ransomware attacks.

FIG. 7 shows an example arrangement for protecting against ransomware attacks in standalone cases, i.e., those that involve a single data storage system and do not rely upon asynchronous replication. In the example shown, snapshot facility 154 performs the desired snapshotting of data object 180. Encircled numerals depict an example sequence.

At (1), the snapshot facility 154 generates a first snapshot S1 of data object 180 at a first point in time.

At (2), which occurs sometime later, the snapshot facility 154 takes a second snapshot S2 of the data object 180, i.e., at a second point in time. The interval between the first and second snapshots may be set by an administrator, for example.

At (3), the snapshot facility 154 computes a deltaset 414, which provides a difference between S1 and S2. The deltaset 414 identifies blocks that were written to the data object 180 between the first and second points in time.

At (4), the RWPM 170 directs a modified read operation 710 of descriptors 532 and obtains from the read operation 710 certain attributes 720. The attributes 720 may include the above-described compressed size 536 and/or dedupe flag 538. At this time, the RWPM 170 may also obtain or determine other attributes, such as attribute 722 indicating a cache hit rate.

At (5), the RWPM 170 processes the attributes 720 and 722 (as well as any other attributes) and determines whether a suspected ransomware attack is detected. If an attack is detected, then at (6) the RWPM 170 sends an alert 432 and at (7) the RWPM 170 directs the snapshot facility 154 to secure S1, e.g., by taking a pre-attack snapshot 340 of S1 and protecting the pre-attack snapshot 340 from deletion or tampering. In some examples, the alert 432 is sent after, rather than before, S1 is secured, with the priority being to preserve S1. If the suspected ransomware attack is confirmed, then the data object 180 may be restored from the pre-attack snapshot 340.

Figure 8:
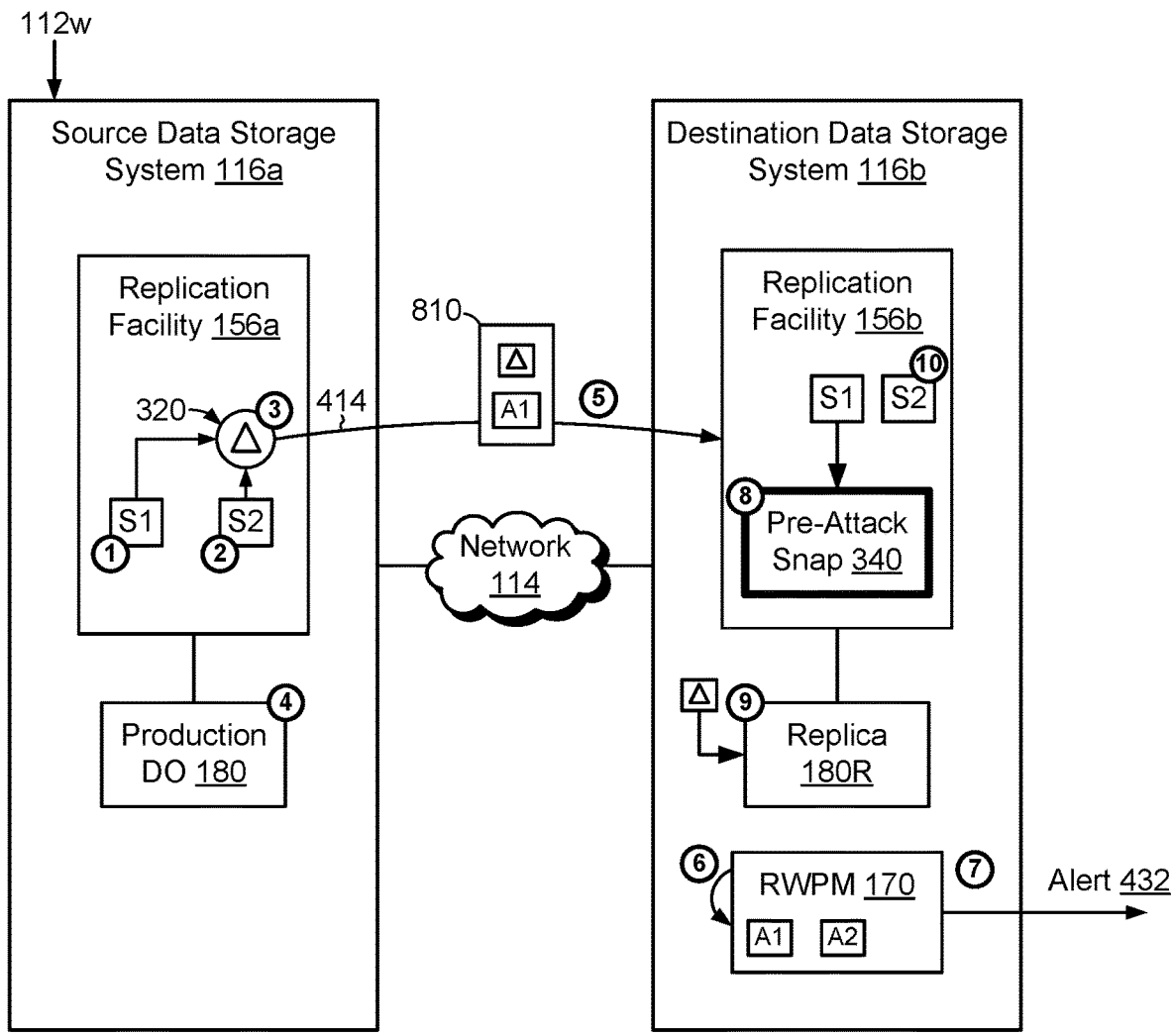
FIG. 8 is a block diagram of an example arrangement in which asynchronous replication between two data storage systems is used for protecting data from ransomware attacks.

FIG. 8 shows an example arrangement for protecting against ransomware attacks in cases that use asynchronous replication. Here, replication facility 156a on a first data storage system 116a (source) coordinates with replication facility 156b on a second data storage system 116b (destination) to perform the desired snapshotting of data object 180 and related activities. Replication of the data object 180 creates and maintains a replica 180R of the data object 180 in the second data storage system 116b. Once again, encircled numerals depict an example sequence.

At (1), the replication facility 156a generates a first snapshot S1 of data object 180 at a first point in time.

At (2), which occurs sometime later, the replication facility 156a takes a second snapshot S2 of the data object 180, i.e., at a second point in time.

At (3), the replication facility 156a computes a deltaset 414, which provides a difference between S1 and S2. The deltaset 414 identifies blocks that were written to the data object 180 between the first and second points in time.

At (4), the replication facility 156a performs a "read for replication" by reading the blocks identified in the deltaset 414. When doing so, the replication facility 156a also obtains certain attributes A1, e.g., by reading associated descriptors 432 to obtain the compressed size 536 and/or dedupe flag 538 for each of the identified blocks.

At (5), the replication facility 156a sends change information 810 to the replication facility 156b in the second data storage system 116b, which receives the change information 810. The change information 810 includes the deltaset 414 (including the specified blocks) as well as any attributes A1 acquired or otherwise determined by the first data storage system 116a. Here, we assume that the replication facility 156b has already created a snapshot S1, e.g., a snapshot of the replica 180R taken prior to applying the change information 810. Snapshot S1 on the destination matches snapshot S1 on the source.

At (6), the RWPM 170 at the destination processes the received attributes A1, along with attributes A2 (if any) obtained or otherwise provided at the destination, and determines whether a suspected ransomware attack is detected. If an attack is detected, then at (7) the RWPM 170 sends an alert 432 and at (8) the RWPM 170 directs the replication facility 156b to secure local snapshot S1, e.g., by taking a pre-attack snapshot 340 of S1 and protecting the pre-attack snapshot 340 from deletion or tampering. In some examples, the order of acts (7) and (8) may be reversed, or the two acts may be performed simultaneously.

At (9), which may be performed regardless of a suspected ransomware attack, the replication facility 156b applies the changes specified by deltaset 414 to the replica 180R, to bring the replica 180R up to date with the second snapshot S2 at the source.

At (10), the replication facility 156b may take a snapshot S2 of the replica 180R, which matches S2 at the source. At this point, and with the pre-attack snapshot 340 already secured, S1 may be deleted (i.e., "refreshed"). S2 may then perform the role of S1 with regard to a subsequent deltaset. Once again, if the suspected ransomware attack is confirmed, then the data object 180 may be restored from the pre-attack snapshot 340.

Implementations that use asynchronous replication may provide certain advantages over standalone implementations. For example, operation of the RWPM 170 imposes a computing workload that can potentially slow down critical, real-time operations of a production system, which may already be busy keeping pace with incoming I/O requests 112. Thus, moving operation of the RWPM 170 from a busy production system to a less-busy replication site offloads the computing workload of operating the RWPM 170 and thus better allows the production system to meet its real-time requirements. Standalone implementations may still be useful, however, in systems having lower performance requirements and in systems that do not provide asynchronous replication.

An improved technique has been described for protecting data from ransomware attacks. The technique identifies a set of blocks (e.g., a deltaset 414) written to a data object 180 between first and second points in time, determines a set of attributes 402 of the set of blocks, and, in response to the set of attributes 402 indicating a likelihood of a ransomware attack, secures a state of the data object as of the first point in time.

Having described certain embodiments, numerous alternative embodiments or variations can be made. For example, although snapshots have been described as a way of capturing the state of data objects as of specified points in time, snapshots are merely an example. Other embodiments may use backup copies, clones, or other versions of data objects.

Also, although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 260 in FIG. 2). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of protecting data from ransomware attacks, comprising:
identifying a set of blocks written to a data object between a first point in time and a second point in time later than the first point in time based on differences in blocks between a first snapshot of the data object taken at the first point in time and a second snapshot of the data object taken at the second point in time;
determining a set of attributes of the identified set of blocks;
processing the set of attributes to generate a current score that indicates a likelihood of a ransomware attack; and
in response to the set of attributes indicating the likelihood of the ransomware attack, securing a state of the data object as of the first point in time,
wherein the data object is hosted from a first data storage system that performs asynchronous replication with a second data storage system to maintain a replica of the data object in the second data storage system, wherein the first snapshot and the second snapshot are generated by the first data storage system as part of the asynchronous replication, and wherein processing the set of attributes is performed by the second data storage system after receiving the set of blocks.

2. The method of claim 1, further comprising, in response to the set of attributes indicating the likelihood of the ransomware attack, sending a ransomware alert to a user.

3. The method of claim 1, wherein securing the state of the data object includes creating a pre-attack snapshot as a copy of the first snapshot.

4. The method of claim 1, further comprising, after the ransomware attack, restoring the data object based on the first snapshot.

5. The method of claim 1, further comprising:
generating, over a course of multiple operations, multiple scores based on multiple respective sets of attributes;
establishing a baseline score based on the multiple scores; and
identifying a suspected ransomware attack based on the current score exceeding the baseline score by a specified amount.

6. The method of claim 5, wherein the specified amount is user-adjustable.

7. The method of claim 1, wherein processing the set of attributes to generate the current score includes providing a set of weights of respective attributes of the set of attributes, each of the set of weights specifying a degree to which the respective attribute contributes to the current score.

8. The method of claim 7, further comprising adjusting the set of weights over time based on feedback, the feedback indicating whether suspected ransomware attacks indicate true ransomware attacks or false positives.

9. The method of claim 8, wherein adjusting the set of weights is performed by a batch learning procedure that responds to determinations of suspected ransomware attacks, feedback based on the determinations, and attributes of identified sets of blocks associated with the determinations.

10. A method of protecting data from ransomware attacks, comprising:
identifying a set of blocks written to a data object between a first point in time and a second point in time later than the first point in time, including identifying differences in blocks between a first snapshot of the data object taken at the first point in time and a second snapshot of the data object taken at the second point in time;
determining a set of attributes of the identified set of blocks; and
in response to the set of attributes indicating a likelihood of a ransomware attack, securing a state of the data object as of the first point in time,
wherein determining the set of attributes includes:
providing a count of blocks in the identified set of blocks; and
providing at least one measure of entropy of the blocks in the identified set of blocks.

11. The method of claim 10, further comprising estimating said at least one measure of entropy based on a compressibility of the blocks in the identified set of blocks and/or portions of the blocks in the identified set of blocks.

12. The method of claim 10, wherein determining the set of attributes further includes providing a measure of sequentiality of the blocks in the identified blocks.

13. The method of claim 10, wherein determining the set of attributes further includes providing a measure of dedupability of the blocks in the identified set of blocks.

14. The method of claim 10, wherein determining the set of attributes further includes estimating a frequency of writes after reads to the data object.

15. The method of claim 14, wherein estimating the frequency of writes after reads is based at least in part on a cache hit rate for writes to the data object.

16. A system, comprising a first data storage apparatus and a second data storage apparatus configured to perform replication of a data object hosted by the first data storage apparatus, each data storage apparatus including respective control circuitry formed from a respective set of processors and respective memory,
the control circuitry of the first data storage apparatus constructed and arranged to:
identify a set of blocks written to the data object between a first point in time and a second point in time later than the first point in time based on differences in blocks between a first snapshot of the data object taken at the first point in time and a second snapshot of the data object taken at the second point in time; and
send the identified set of blocks to the second data storage system, the control circuitry of the second data storage apparatus constructed and arranged to:
receive the identified set of blocks; and
in response to a set of attributes of the identified set of blocks indicating a likelihood of a ransomware attack, secure a state of the data object as of the first point in time,
wherein the control circuitry of the second data storage apparatus is further constructed and arranged to process the set of attributes to generate a current score that indicates the likelihood of the ransomware attack, including to provide a set of weights of respective attributes of the set of attributes, each of the set of weights specifying a degree to which the respective attribute contributes to the current score.

17. The system of claim 16, wherein the control circuitry of the second data storage apparatus is further constructed and arranged to adjust the set of weights over time based on feedback, the feedback indicating whether suspected ransomware attacks indicate true ransomware attacks or false positives.

18. The system of claim 17, wherein the control circuitry of the second data storage apparatus constructed and arranged to adjust the set of weights is further constructed and arranged to perform by a batch learning procedure that responds to determinations of suspected ransomware attacks, feedback based on the determinations, and attributes of identified sets of blocks associated with the determinations.

19. A computer program product including a set of non-transitory, computer-readable media having instructions which, when executed by control circuitry of a computerized apparatus, cause the computerized apparatus to perform a method of protecting data from ransomware attacks, the method comprising:
identifying a set of blocks written to a data object between a first point in time and a second point in time later than the first point in time based on differences in blocks between a first snapshot of the data object taken at the first point in time and a second snapshot of the data object taken at the second point in time;
determining a set of attributes of the identified set of blocks;
processing the set of attributes to generate a current score that indicates the likelihood of a ransomware attack; and in response to the set of attributes indicating the likelihood of the ransomware attack, securing a state of the data object as of the first point in time,
wherein the method further comprises:
   generating, over a course of multiple operations, multiple scores based on multiple respective sets of attributes;
   establishing a baseline score based on the multiple scores; and
   identifying a suspected ransomware attack based on the current score exceeding the baseline score by a specified amount.

20. The computer program product of claim 19, wherein the specified amount is user-adjustable.

* * * * *